(12) United States Patent
Katayama et al.

(10) Patent No.: US 8,418,669 B2
(45) Date of Patent: Apr. 16, 2013

(54) INTERNAL COMBUSTION ENGINE

(75) Inventors: Goichi Katayama, Wako (JP); Yoshihiro Fujiyoshi, Wako (JP); Yutaka Tajima, Wako (JP); Shoichi Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 13/024,815

(22) Filed: Feb. 10, 2011

(65) Prior Publication Data

US 2011/0209680 A1 Sep. 1, 2011

(30) Foreign Application Priority Data

Feb. 12, 2010 (JP) ................................ 2010-028421

(51) Int. Cl.
*F02B 75/06* (2006.01)
(52) U.S. Cl.
USPC ....................................... 123/192.2; 123/192.1
(58) Field of Classification Search ................ 123/192.1, 123/192.2
See application file for complete search history.

(56) References Cited

U.S. PATENT DOCUMENTS

| | | | | |
|---|---|---|---|---|
| 4,573,439 A * | 3/1986 | Kasting | ...................... | 123/195 A |
| 5,038,731 A * | 8/1991 | Shimada | ..................... | 123/192.2 |
| 5,218,885 A * | 6/1993 | Nakano et al. | ................... | 74/591 |
| 6,213,072 B1 * | 4/2001 | Sayama et al. | .............. | 123/90.31 |
| 6,286,474 B1 * | 9/2001 | Downs et al. | .............. | 123/192.2 |
| 7,398,753 B2 * | 7/2008 | Masuda et al. | .............. | 123/192.2 |
| 7,401,589 B2 * | 7/2008 | Oishi et al. | ................ | 123/196 R |
| 7,748,292 B2 * | 7/2010 | Takeuchi | ......................... | 74/595 |
| 2004/0244757 A1 * | 12/2004 | Takeuchi | .................... | 123/192.2 |
| 2004/0250789 A1 * | 12/2004 | Morii et al. | ................. | 123/192.2 |
| 2005/0016490 A1 * | 1/2005 | Stone | ......................... | 123/195 A |
| 2007/0056543 A1 | 3/2007 | Romblom | | |
| 2008/0227578 A1 * | 9/2008 | Imura | .............................. | 475/82 |

FOREIGN PATENT DOCUMENTS

| | | |
|---|---|---|
| DE | 103 14 969 A1 | 10/2004 |
| DE | 10 2006 030 917 A1 | 12/2007 |
| EP | 1 447 542 A1 | 8/2004 |
| GB | 2 082 682 A | 3/1982 |
| JP | 8-338257 A | 12/1996 |
| JP | 2004-245131 A | 9/2004 |
| JP | 2007-024188 A | 2/2007 |

\* cited by examiner

*Primary Examiner* — Noah Kamen
*Assistant Examiner* — Long T Tran
(74) *Attorney, Agent, or Firm* — Arent Fox LLP

(57) ABSTRACT

In an internal combustion engine having a pair of balancer shafts (53, 54), an engine torque is transmitted from a crank gear (28) to an oil pump gear (74) on a drive shaft (73) of an oil pump (71) via a first idler gear (84) and the first balancer shaft gear (64). The engine torque is also transmitted to a fuel pump (72) from the crank gear to a fuel pump gear (78) via the first idler gear and a second idler gear (86), and to the second balancer shaft gear (67) via the first idler gear and second idler gear. Alternatively, the engine torque may be transmitted to the fuel pump from the crank gear to the fuel pump gear via the first idler gear, second balancer shaft gear and second idler gear. As the oil pump gear is actuated by the crank gear via the first idler gear, the oil pump gear is not subjected to the loading caused by the balancer shaft, and hence can be made of a compact and light-weight gear. Furthermore, this allows the various gears to be arranged in an efficient (in terms of the overall weight for the given mechanical strength requirements) and compact manner.

9 Claims, 3 Drawing Sheets

INTERNAL COMBUSTION ENGINE

TECHNICAL FIELD

The present invention relates to an internal combustion engine including a power transmission mechanism for transmitting a crankshaft output to balancer shafts and at least one engine auxiliary device.

BACKGROUND OF THE INVENTION

Dynamic balancers are effective in canceling imbalances in reciprocating engines, and typically include a pair balancer shafts each incorporated with an eccentric mass for counteracting the imbalance in the moving parts of the engine. When the engine accelerates or decelerates, each balancer shaft applies a load to the engine. Particularly in the case of a diesel engine, some rotational fluctuations are inevitable, and this adds to the load of the engine. Furthermore, a diesel engine includes a fuel pump for pressurizing the fuel to a high pressure, and this also applies a fluctuating load to the engine.

The engine disclosed in JP 2004-245131A (patent document 1) uses a gear train, instead of the more conventional timing belt or timing chain, for transmitting the output torque of a crankshaft to balancer shafts and the drive shaft of a fuel pump. However, the various gears are arranged in a highly complex layout, and there is some room for improvement with respect to the optimization of the gear layout. In particular, more compact design and weight reduction are desired.

BRIEF SUMMARY OF THE INVENTION

In view of such problems of the prior art, a primary object of the present invention is to provide an internal combustion engine that can optimize the layout of gears for transmitting an output torque of a crankshaft to balancer shafts and drive shafts of engine auxiliary devices.

A second object of the present invention is to provide a light-weight and compact internal combustion engine that uses gears for transmitting an output torque of a crankshaft to balancer shafts and drive shafts of engine auxiliary devices.

According to the present invention, such an object can be accomplished by providing an internal combustion engine, comprising: a cylinder block defining a bank of cylinders and including a crankcase; a cylinder head attached to an end of the cylinder block remote from the crankcase; a crankshaft rotatably supported by the crankcase; a first and second balancer shaft extending in parallel with the crankshaft on either side thereof at positions intermediate between the crankshaft and cylinder head; at least one auxiliary device having a drive shaft extending in parallel with the crankshaft; a first gear fitted on the crankshaft; a second and third gear fitted on the first and second balancer shafts; a fourth gear fitted on the drive shaft of the auxiliary device; a first transmission gear meshing with both the first and second gears; and a second transmission gear meshing with both the first transmission gear and second gear; wherein the fourth gear is actuated by the first gear via one of the second gear and third gear.

The engine auxiliary device may consist of, not exclusive, a fuel pump, oil pump, alternator, generator, compressor or water pump. The gears typically consist of spur gears, but at least some of the gears may consist of gears other than spur gears without departing from the spirit of the present invention. As the fourth gear simply receives the engine torque from the first gear via one of the second gear and third gear, the fourth gear on the drive shaft of the auxiliary device is not subjected to the loading caused by the balancer shaft, and hence can be made of a compact and light-weight gear. Furthermore, this allows the various gears to be arranged in an efficient (in terms of the overall weight for the given mechanical strength requirements) and compact manner.

The engine may further comprise a fuel pump having a drive shaft located above the crankshaft, and actuated by the crankshaft via a gear train. Thereby, the fuel pump is located in the vicinity of the cylinder bank so that the length of the passage between the fuel pump and common rail or each fuel injection valve can be minimized. This also contributes to the compact and light-weight design of the engine.

According to a preferred embodiment of the present invention, the first gear and first transmission gear have a substantially same pitch diameter. In particular, the camshaft of the engine may be actuated by a rotary member located above the crankshaft via a timing chain or belt, and the rotary member is in turn actuated by the crankshaft via a gear train. Thereby, the timing chain or belt is required to have a relatively small length, and this contributes to the improvements in the synchronization of the camshafts with the crankshaft and the reliability of the engine. Typically, the rotary member actuated by the crankshaft via the timing chain or belt comprises a drive shaft of a fuel pump for pressurizing engine fuel.

The gear train may comprise the first gear, first transmission gear and second transmission gear or, alternatively, the first gear, first transmission gear, second transmission gear and third gear.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
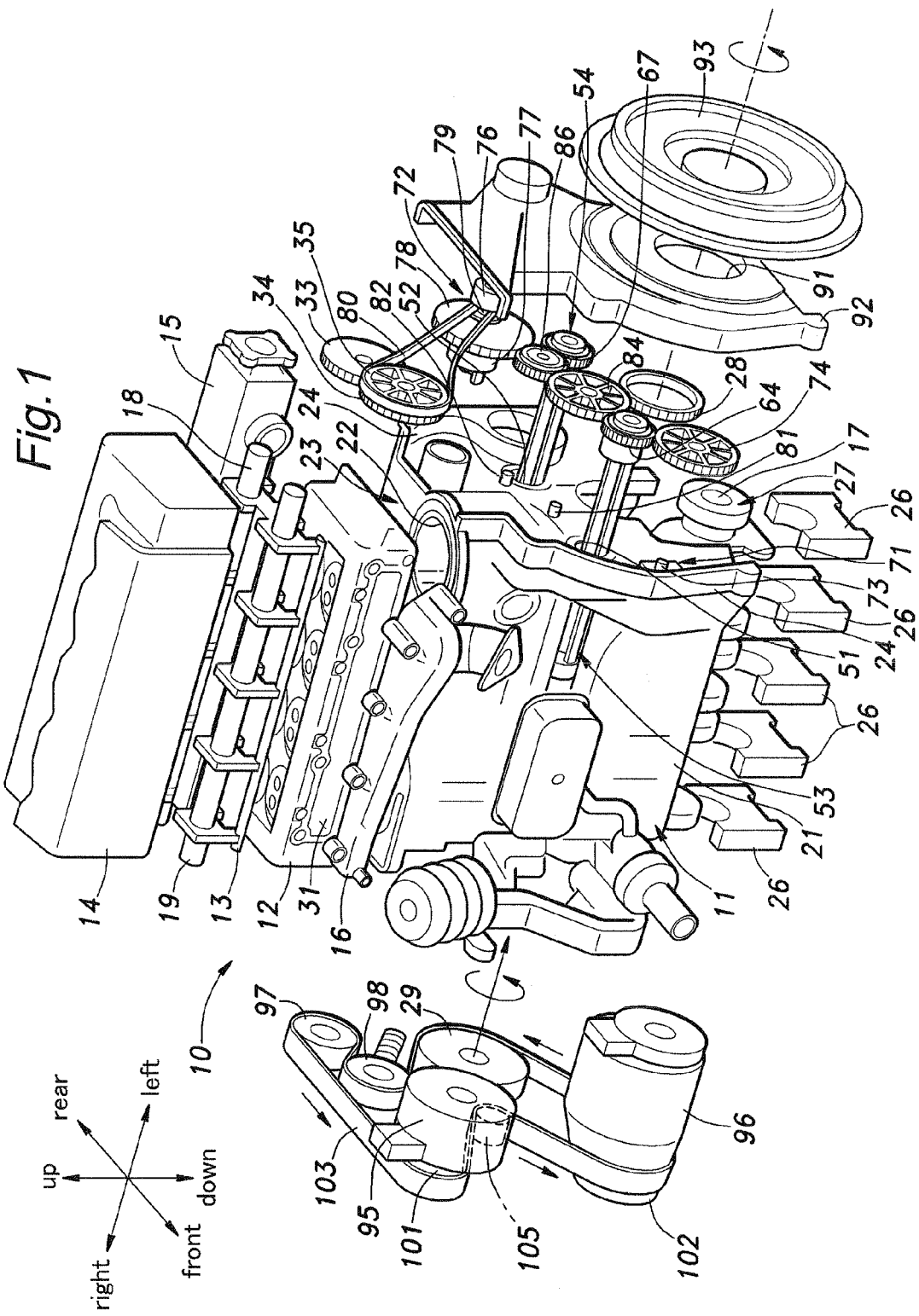
FIG. 1 is an exploded perspective view of an internal combustion engine embodying the present invention.

Referring to FIG. 1, an embodiment of the present invention in the form of a diesel engine is described in the following. The illustrated diesel engine 1 is laterally mounted on a vehicle body, and the directions in the following description are based on the understanding that the forward direction coincides with the forward direction of the vehicle as indicated in FIG. 1. The diesel engine 10 comprises a cylinder block 11, a cylinder head 12, a camshaft bearing holder 13, a cylinder head cover 14, an intake manifold 15, an exhaust manifold 16, a crankshaft 17, an intake camshaft 18, an exhaust camshaft 19 and an oil pan (not shown in the drawings), essentially in a conventional manner.

The cylinder block 11 includes a crankcase 21 which defines a chamber opening out in a downward direction, and an in-line bank 23 of four cylinders 22 provided above the crankcase 21. The left side of the cylinder block 11 is formed with a protruding wall 24 extending substantially over the entire fore and aft length of the cylinder block 11. The crankcase 21 is internally provided with a plurality of vertically extending crank journal walls (not shown in the drawings) on which corresponding bearing caps 26 are secured so as to jointly define crank journals for rotatably supporting the crankshaft 17 having an axial line extending in the longitudinal direction of the cylinder block 11.

The left end 27 of the crankshaft 17 protrudes leftward from the left side of the crankcase 21, and is fitted with a crank gear (first gear) 28 so as to be rotationally fast with the crankshaft 17. The right end (not shown in the drawings) protrudes rightward from the right side of the crankcase 21, and is fitted with a crank pulley 29 so as to be rotationally fast with the crankshaft 17.

Each cylinder 22 receives a piston (not shown in the drawings) which is configured for a vertical reciprocating movement therein, and is connected to the crankshaft 17 via a connecting rod so that the reciprocating movement of the piston is converted into a rotation of the crankshaft 17.

The cylinder head 12 is connected to the upper end of the cylinder block 11, and defines combustion chambers in cooperation with the corresponding cylinders 22. In particular, the cylinder head 12 defines a roof of each combustion chamber, and is formed with an intake passage (not shown in the drawings) extending from the roof of each combustion chamber to the rear side of the cylinder block 11 and an exhaust passage 31 extending from the roof of each combustion chamber to the front side of the cylinder block 11. The intake manifold 15 is attached to the rear side of the cylinder head 12 so as to communicate with the intake passages, and the exhaust manifold 16 is attached to the front side of the cylinder head 12 so as to communicate with the exhaust passages.

The camshaft bearing holder 13 is provided in the upper end of the cylinder head 12 for rotatably supporting the intake camshaft 18 and the exhaust camshaft 19 in parallel with the crankshaft 17. The intake camshaft 18 and exhaust camshaft 19 are configured to actuate the intake valves and exhaust valves (not shown in the drawings) of the engine via a link mechanism for selectively communicating each combustion chamber with the corresponding intake passage and exhaust passage 31.

The left end of the intake camshaft 18 is fitted with an intake camshaft gear 33 in a rotationally fast manner. The left end of the exhaust camshaft 19 is fitted with an exhaust camshaft gear 34 and an exhaust camshaft sprocket 35 both in a rotationally fast manner. The exhaust camshaft gear 34 meshes with the intake camshaft gear 33, and the exhaust camshaft sprocket 35 is fitted to the rightmost end of the exhaust camshaft 19.

The cylinder block 11 is formed with a first balancer shaft hole 51 at a more front side and higher part thereof than the crankshaft 17, and a second balancer shaft hole 52 at a more rear side and higher part thereof than the crankshaft 17. Each balancer shaft hole 51, 52 may communicate with the adjoining front or rear side wall of the cylinder block 11 as the case may be.

The first balancer shaft hole 51 and second balancer shaft hole 52 rotatably support the first balancer shaft 53 and second balancer shaft 54, respectively, both in parallel with the crankshaft 17. The first balancer shaft 53 is provided with a plurality of cylindrical journal portions arranged along the axial length thereof, and weight portions connecting the adjacent journal portions. Each weight portion is asymmetric with respect to the rotational center of the first balancer shaft 53, and has a gravitational center thereof offset from the rotational center of the first balancer shaft 53. The first balancer shaft 53 is rotatably supported in the first balancer shaft hole 51 at the journal portions via bearings. The second balancer shaft 54 is similar in structure, and is similarly supported in the second balancer shaft hole 52.

The left end of the first balancer shaft 53 protrudes from the left side of the cylinder block 11, and is fitted with a first balancer shaft gear (second gear) 64 in a rotationally fast manner. Likewise, the left end of the second balancer shaft 54 protrudes from the left side of the cylinder block 11, and is fitted with a second balancer shaft gear (third gear) 67 in a rotationally fast manner.

The left side of the cylinder block 11 is provided with engine auxiliary devices such as an oil pump 71 and a fuel pump 72. The oil pump 71 may consist of a known trochoid type or gear type pump, and is provided with a drive shaft 73. As the drive shaft 73 is rotatively actuated, the oil received in the oil pan is delivered to various parts of the engine under pressure. The oil pump 71 is located more to the front of the crankshaft 17 on the left side of the cylinder block 11. The oil pump 71 may be located at a substantially same elevation as the crankshaft 17 or, alternatively, slightly higher or lower than the latter. The drive shaft 73 of the oil pump 71 extends in parallel with the crankshaft 17, and is fitted with an oil pump gear (fourth gear) 74 in a rotationally fast manner.

The fuel pump 72 may be configured to deliver fuel under pressure to a common rail (not shown in the drawings) or to directly deliver fuel under pressure to each fuel injection valve (not shown in the drawings) without involving any common rail. The fuel pump 72 is provided with a drive shaft 76. As the drive shaft 76 is rotatively actuated, the fuel is pressurized and fed to the common rail or to the fuel injection valves. The fuel pump 72 is located more to the rear and above the crankshaft 17 on the left side of the cylinder block 11. The drive shaft 76 of the fuel pump 72 is fitted with a fuel pump gear (fourth gear) 78 and a fuel pump sprocket 79 both in a rotationally fast manner. The fuel pump sprocket 79 is provided in the leftmost end part of the drive shaft 76. An endless timing chain or belt 80 is passed around the fuel pump sprocket 79 and exhaust camshaft sprocket 35. The diameters (or numbers of teeth) of the fuel pump sprocket 79 and exhaust camshaft sprocket 35 are determined such that the exhaust camshaft sprocket 35 rotates twice as fast as the crank gear 28. The rotation of the exhaust camshaft 19 is transmitted to the intake camshaft 18 by the meshing of the exhaust camshaft gear 34 and intake camshaft gear 33.

The left side of the cylinder block 11 is additionally provided with a first shaft 81 and a second shaft 82 both extending in parallel with the crankshaft 17. The first shaft 81 and second shaft 82 are located on either lateral side of the crankshaft 17 at a higher elevation than the crankshaft 17, and the first shaft 81 rotatably supports a first idler gear 84 via a bearing 83 while the second shaft 82 rotatably supports a second idler gear 86 via a bearing 85.

Figure 2:
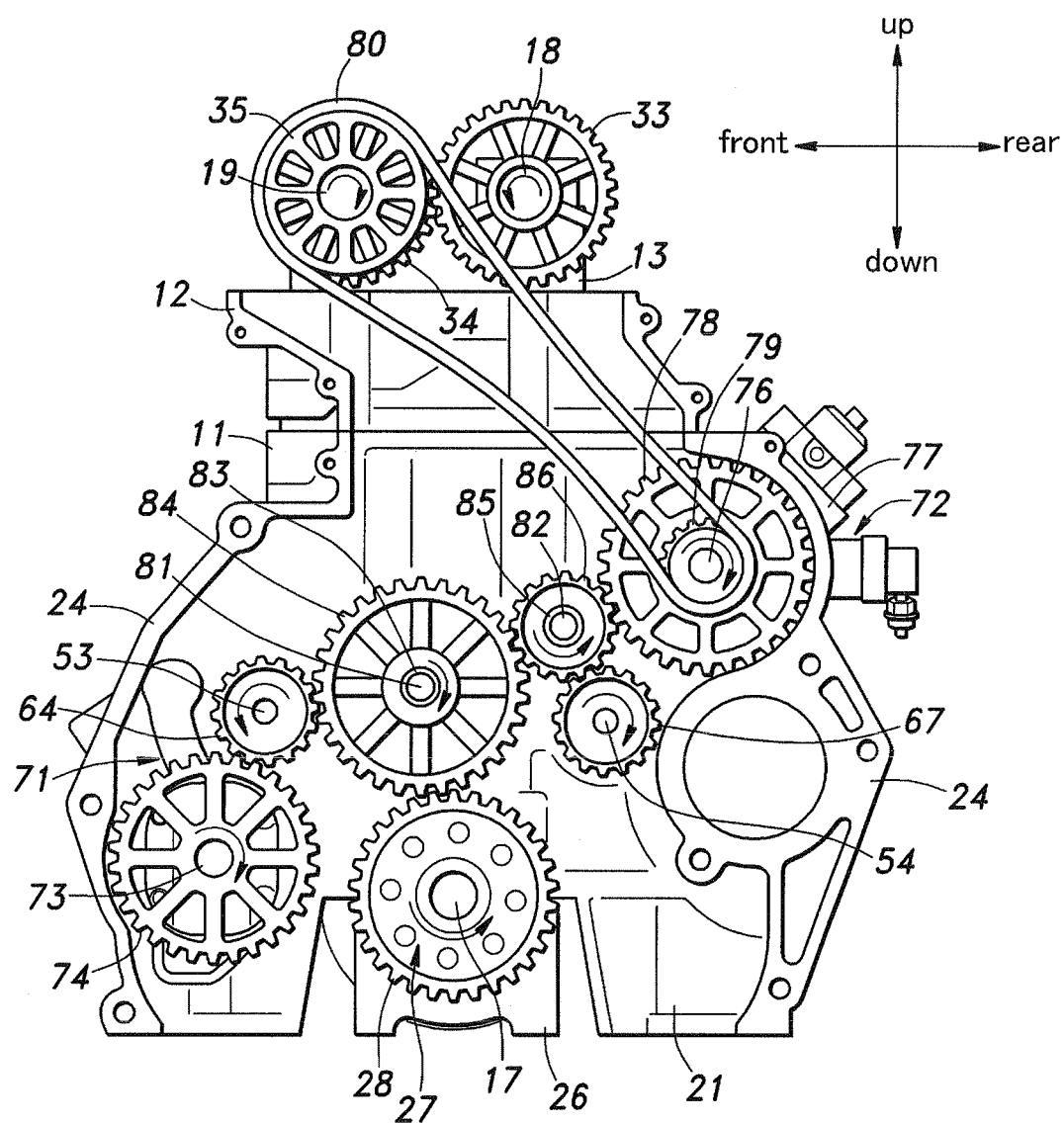
FIG. 2 is a front view of the engine shown in FIG. 1.

As shown in FIG. 2, the first idler gear 84 meshes with the crank gear 28, first balancer shaft gear 64, and second idler gear 86. The second idler gear 86 meshes with the second balancer shaft gear 67 and fuel pump gear 78 as well as with the first idler gear 84. The oil pump gear 74 meshes with the first balancer shaft gear 64. Therefore, as the crankshaft 17 rotates, the first balancer shaft 53, second balancer shaft 54, drive shaft 73 of the oil pump 71, drive shaft 76 of the fuel pump 72, exhaust camshaft 19 and intake camshaft 18 rotate in synchronism. Therefore, the engine torque is transmitted from the crank gear 28 to the first idler gear 84 and then to the oil pump gear 74. The engine torque is also transmitted from the crank gear 28 to the fuel pump gear 78 via the first and second idler gears 84 and 86. The second idler gear 86 also transmits the engine torque to the second balancer shaft gear 67. In short, there are three branch paths of torque transmission in this embodiment.

In particular, the first idler gear 84 has a substantially same pitch diameter as the crank gear 28. The first balancer shaft gear 64, second balancer shaft gear 67 and second idler gear 86 have a same pitch diameter which is half as large as the pitch diameter of the crank gear 28 and first idler gear 84. The first balancer shaft gear 64 is actuated by the crank gear 28 via the first idler gear 84, and the second balancer shaft gear 67 is actuated by the crank gear 28 via the first idler gear 84 and second idler gear 86. Therefore, the first balancer shaft 53 and second balancer shaft 54 rotate at a same rotational speed in opposite directions. The rotational speed of the first balancer shaft 53 and second balancer shaft 54 is twice as high as the rotational speed of the crank gear 28.

To the left side of the cylinder block 11 is attached a chain cover 92 which covers the first balancer shaft gear 64, second balancer shaft gear 67, oil pump gear 74, fuel pump gear 78 (fuel pump sprocket 79), first idler gear 84, second idler gear 86 and crank gear 28. The chain cover 92 is formed with a through hole 91 through which an end of the crankshaft 17 is passed. The leftmost end 27 of the crankshaft 17 protruding from the through hole 91 of the chain cover 92 is fitted with a flywheel 93 in a rotationally fast manner.

To the right side of the cylinder block 11 are attached an alternator 95, a compressor 96 (for an air conditioner), a plurality of idler pulleys 97, a belt tensioner 98 and a water pump (not shown in the drawings). An alternator pulley 101 is fitted on a drive shaft of the alternator 95 in a rotationally fast manner. A compressor pulley 102 is fitted on a drive shaft of the compressor 96 in a rotationally fast manner. A water pump pulley 105 is fitted on a drive shaft of the water pump in a rotationally fast manner. An endless belt 103 is passed around the crank pulley 29, alternator pulley 101, compressor pulley 102, water pump pulley 105, idler pulleys 97 and belt tensioner 98.

The rotation of the crankshaft 17 is transmitted to the first balancer shaft 53, second balancer shaft 54, oil pump 71 and fuel pump 72 via the corresponding gears. As opposed to the timing belt or timing chain, substantially no timing error is produced and the possibility of slippage can be eliminated with the result that the rotation of the crankshaft 17 can be reliably transmitted to the balancer shafts 53 and 54 and engine auxiliary devices 71 and 72.

In the illustrated embodiment, the first balancer shaft 53 and second balancer shaft 54 are placed above the crankshaft 17, and the first balancer shaft gear 64 is placed in the path of power transmission between the crank gear 28 and oil pump gear 74 so that the necessary number of gears for the power transmission can be minimized, and a highly compact gear layout is enabled.

The crank gear 28 may be considered as being located in the upstream end of the power transmission path. The oil pump gear 74 is located downstream of the first balancer shaft gear 64, instead of being upstream thereof. The fuel pump gear 78 is located downstream of the first idler gear 84 and second idler gear 86. The second balancer shaft gear 67 is also located downstream of the first idler gear 84 and second idler gear 86, and has nothing downstream thereof.

The first balancer shaft 53 and second balancer shaft 54 are required to withstand a significant loading particularly when the rotational speed of the engine fluctuates. In the illustrated embodiment, as the gears for the drive shafts of the auxiliary devices such as the oil pump gear 74 and fuel pump gear 78 are located downstream of the first balancer shaft 53 and second idler gear 86, respectively, the oil pump gear 74 and fuel pump gear 78 are not required to withstand any additional loading created by the balancer shafts 53 and 54. Therefore, if desired, the oil pump gear 74 and/or fuel pump gear 78 may be made of plastic or other light-weight and low-cost material without any problem.

In the illustrated embodiment, because the first balancer shaft 53 and second balancer shaft 54 are placed above the crankshaft 17, and mostly above the liquid level of the lubricating oil in the oil pan, the need for baffle plates or other members for separating the first balancer shaft 53 and second balancer shaft 54 from the engine oil can be eliminated. This contributes to the simplification and weight reduction of the engine. Also, the first balancer shaft 53 and second balancer shaft 54 may be placed close to the cylinder bank 23 which demonstrates a relatively high stiffness as compared to other parts of the cylinder block 11. Therefore, the need for a reinforcing structure for supporting the bearings of the first balancer shaft 53 and second balancer shaft 54 may be eliminated.

In the illustrated embodiment, the crank gear 28 does not directly mesh with the first balancer shaft gear 64 or second balancer shaft gear 67. The first balancer shaft gear 64 meshes with the crank gear 28 via the first idler gear, and the second balancer shaft gear 67 meshes with the crank gear 28 via the first idler gear 84 and second idler gear 86. The first balancer shaft 53, second balancer shaft 54 and second idler gear 86 have a diameter which is half as large as the diameter of the crank gear 28 and first idler gear 84. Therefore, the crank gear 28 and first idler gear 84 may have a relatively small diameter, and this contributes to a compact design of the engine.

As the fuel pump 72 is placed in a relatively upper part of the cylinder block 11, the rotation of the drive shaft of the fuel pump 72 can be transmitted to the exhaust camshaft 19 by using a relatively short endless timing belt or chain 80, and this contributes to the compact design of the engine, and the minimization of a slack in the timing belt or chain 80.

Figure 3:
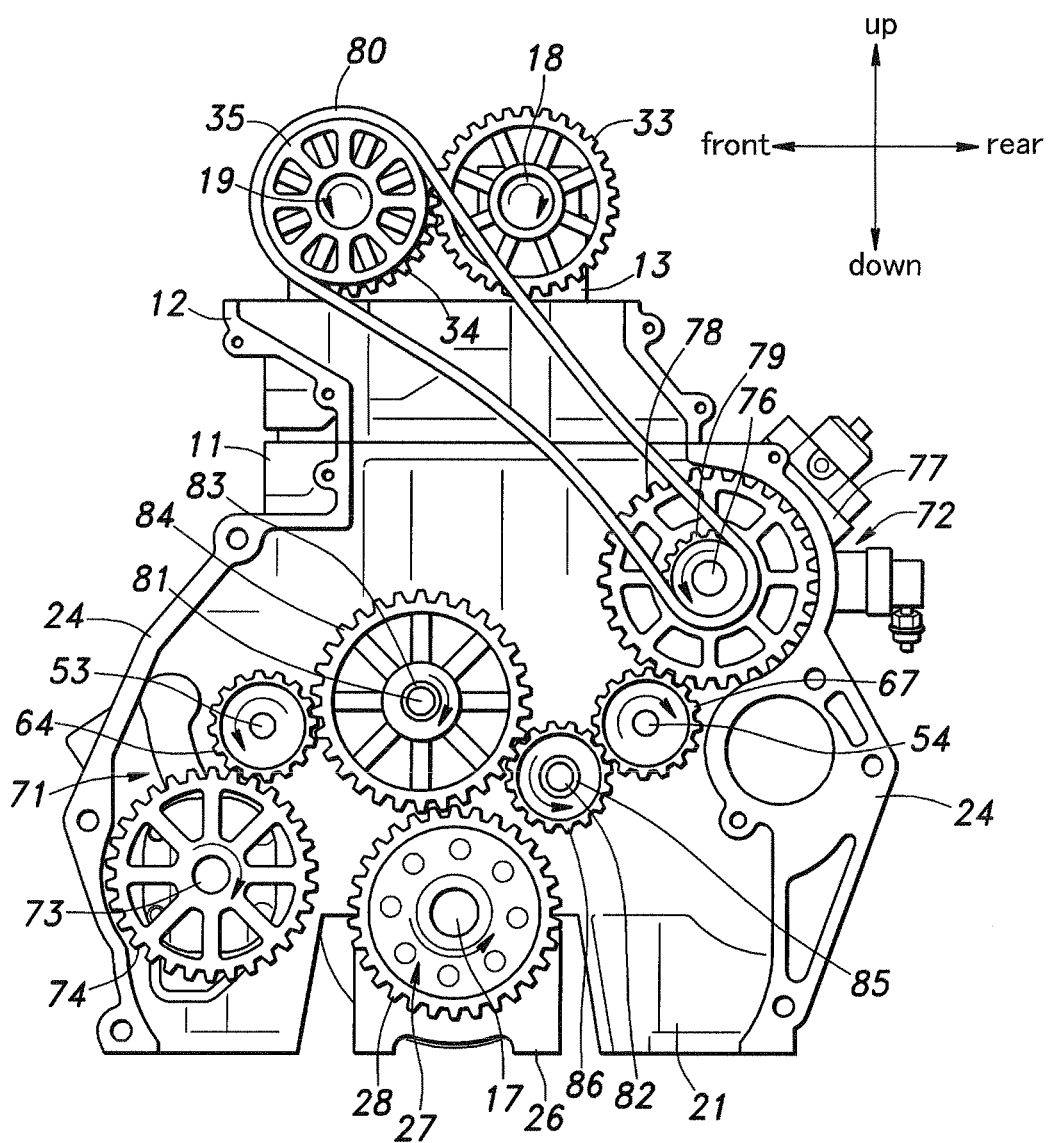
FIG. 3 is a view similar to FIG. 2 showing a second embodiment of the present invention.

FIG. 3 shows a second embodiment of the present invention which differs from the first embodiment in the layout of the second balancer shaft 54, the second idler shaft 82 and associated parts. As the second embodiment is otherwise similar to the first embodiment, the parts corresponding to the first embodiment are denoted with like numerals in FIG. 3, and the discussion of such parts is omitted in the following description.

In the second embodiment, the second idler gear 86 meshes with the first idler gear 84 and second balancer shaft gear 67 to transmit the rotation of the first idler gear 84 to the second balancer gear 67. The second balancer gear 67 additionally meshes with the fuel pump gear 78 to transmit the rotation of the second idler gear 86 to the fuel pump gear 78.

The path of power transmission from the first idler gear 84 to the fuel pump gear 78 and second balancer shaft gear 67 was bifurcated in the first embodiment, but the path of power transmission formed by the first idler gear 84, second idler gear 86, second balancer shaft gear 67 and fuel pump gear 78 in the second embodiment is strictly in series. Thus, at least part of the gears can be arranged in a number of different ways. However, in this case also, the oil pump 71 is actuated by the first balancer shaft gear 64 or, in other words, is placed downstream of the first balancer shaft gear 64 in the path of power transmission. Furthermore, in the second embodiment, the fuel pump 72 is actuated by the second balancer shaft gear 67 or, in other words, is placed downstream of the second balancer shaft gear 67 in the path of power transmission.

Although the present invention has been described in terms of preferred embodiments thereof, it is obvious to a person skilled in the art that various alterations and modifications are possible without departing from the scope of the present invention which is set forth in the appended claims.

For instance, the foregoing embodiments were directed to a diesel engine, but the present invention is equally applicable to gasoline or gas engines. The alternator 95, air compressor 96 and water pump attached to the right side of the cylinder block 11 in the illustrated embodiments may also be attached to the left side of the cylinder block 11. In that case, the drive shafts of these engine auxiliary devices may be fitted with corresponding gears in a rotational fast manner such that these gear may mesh with any of the first and second idler gears 84 and 86, first and second balancer shaft gears 64 and 67, oil pump gear 74 and fuel pump gear 78 so as to be actuated by them. In this case also, at least one of the alternator 95, air compressor 96 and water pump is placed downstream of the first balancer shaft gear 64 and/or second balancer shaft gear 67 or in the path of power transmission.

The exhaust camshaft 19 was coupled to the drive shaft 73 of the fuel pump 72 via a timing belt of chain 80 in the illustrated embodiment, but, alternatively, the intake camshaft 18 (fitted with a sprocket wheel) may be coupled with the drive shaft of the fuel pump via a timing belt or chain without departing from the spirit of the present invention.

The contents of the original Japanese patent application on which the Paris Convention priority claim is made for the present application as well as those of any prior art references mentioned in this application are hereby incorporated in this application by reference.

The invention claimed is:

1. An internal combustion engine, comprising:
   a cylinder block defining a bank of cylinders and including a crankcase;
   a cylinder head attached to an end of the cylinder block remote from the crankcase;
   a crankshaft rotatably supported by the crankcase;
   a first and second balancer shaft extending in parallel with the crankshaft on either side thereof at positions intermediate between the crankshaft and cylinder head;
   at least one auxiliary device having a drive shaft extending in parallel with the crankshaft;
   a first gear fitted on the crankshaft;
   a second and third gear fitted on the first and second balancer shafts;
   a fourth gear fitted on the drive shaft of the auxiliary device;
   a first transmission gear meshing with both the first and second gears; and
   a second transmission gear meshing with both the first transmission gear and second gear;
   wherein the fourth gear is actuated by the first gear via one of the second gear and third gear.

2. The internal combustion engine according to claim 1, wherein the first gear and first transmission gear have a substantially same pitch diameter.

3. The internal combustion engine according to claim 1, wherein the auxiliary device includes an oil pump for pressurizing engine oil.

4. The internal combustion engine according to claim 1, wherein the auxiliary device includes a fuel pump for pressurizing engine fuel.

5. The internal combustion engine according to claim 1, wherein the engine further comprises a fuel pump having a drive shaft located above the crankshaft, and actuated by the crankshaft via a gear train.

6. The internal combustion engine according to claim 1, further comprising a camshaft, wherein the camshaft is actuated by a rotary member located above the crankshaft via a timing chain or belt, and the rotary member is in turn actuated by the crankshaft via a gear train.

7. The internal combustion engine according to claim 6, wherein the rotary member actuated by the crankshaft via the timing chain or belt comprises a drive shaft of a fuel pump for pressurizing engine fuel.

8. The internal combustion engine according to claim 7, wherein the gear train comprises the first gear, first transmission gear and second transmission gear.

9. The internal combustion engine according to claim 7, wherein the gear train comprises the first gear, first transmission gear, second transmission gear and third gear.

* * * * *